March 8, 1960
T. A. SMITH
2,927,504
CONTROL APPARATUS FOR STEREO PROJECTORS
Filed Sept. 20, 1956
FIG. 1
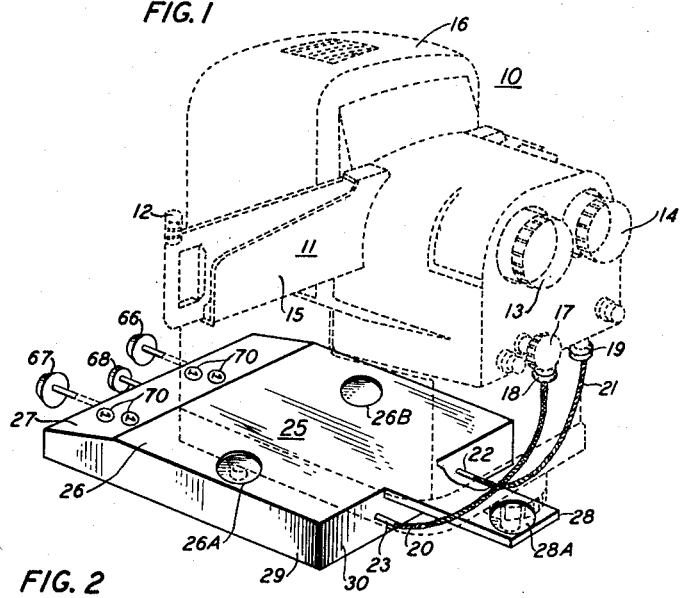
FIG. 2
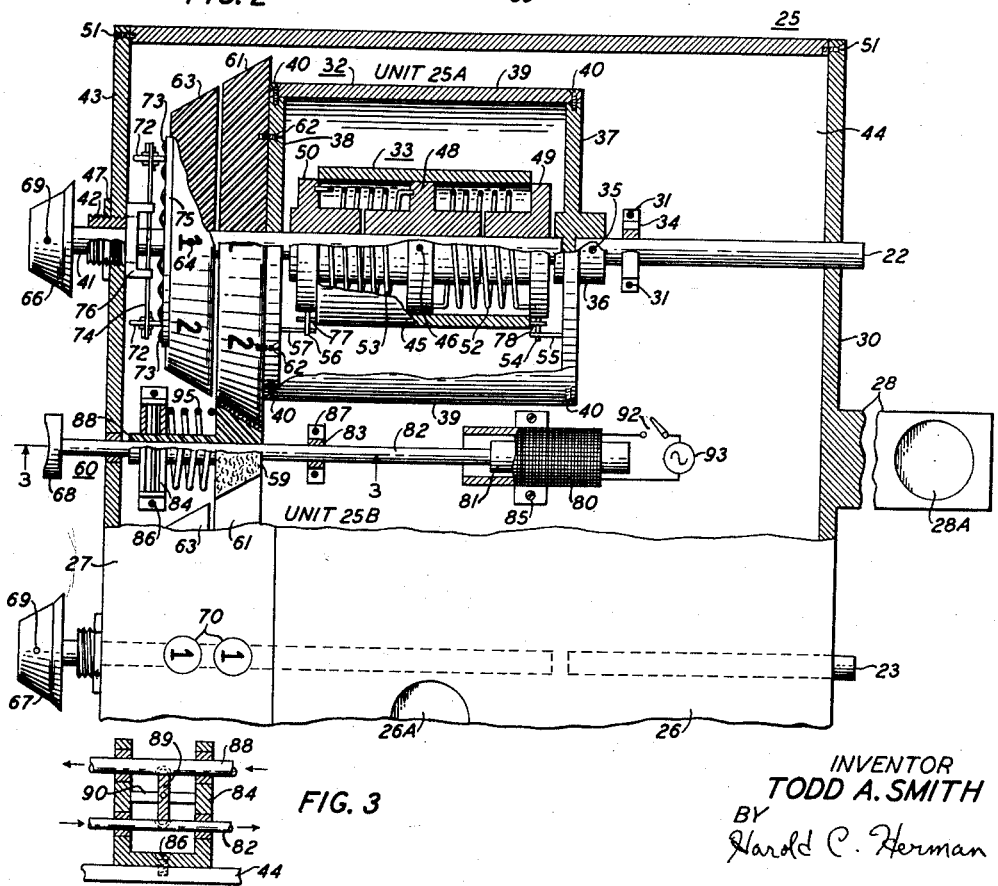
FIG. 3
INVENTOR
TODD A. SMITH
BY
Harold C. Herman
ATTORNEY United States Patent Office 2,927,504
Patented Mar. 8, 1960

2,927,504

CONTROL APPARATUS FOR STEREO PROJECTORS

Todd A. Smith, Richmond Hill, N.Y., assignor of fifty-two and two-tenths percent to Jack Ellerstein, thirty-four and eight-tenths percent to Albert E. Bachelet, both of New York, and eight percent to Harold C. Herman, Brooklyn, N.Y.

Application September 20, 1956, Serial No. 610,947

3 Claims. (Cl. 88—26)

This invention relates to stereo projectors and more particularly to a focusing control system for stereo projectors.

It is well known that a small discrepancy in the register or superimposition of the two views of a stereo pair upon a projection screen will create eyestrain and may destroy the desired third dimension effect. Such discrepancies generally occur due to alignment errors in mounting the stereo pair. For easy viewing on a 50-inch screen, for example, where a mounting error of only 1 millimeter in the conventional 35-millimeter slides enlarges to 50 millimeters, the vertical alignment error between the two views of the stereo pair should be less than 0.15 millimeter and the horizontal alignment error between the two views of the stereo pair should be less than 0.25 millimeter.

The high precision required in mounting the stereo pair is difficult to achieve using conventional mounts and techniques. For example, small variations in the manufacture of the film or of the mounts are factors difficult to overcome economically. It is for this reason that conventional stereo projectors include manual adjusting mechanisms for correcting the alignment errors. The adjustments can be made, however, only after the stereo image has been projected on the screen. The first view of the projected image, therefore, includes the alignment errors. The alignment errors must be manually corrected in view of the audience every time the slide is projected.

It is an object of this invention to avoid the necessity of adjusting a projected stereo image in view of the audience.

Another object of this invention is to provide semi-automatic focusing and alignment adjusting apparatus for stereo projectors.

These objects are achieved in an illustrative embodiment of this invention wherein the slides are previewed to determine the necessary corrections. The corrections relate to the angular position of correcting control knobs which are part of the conventional manual adjusting mechanisms. When a slide is to be projected, the corrections are first registered in mechanical control apparatus as a preselection. When the projection slide carrier is operated to change slides, the screen is blanked in the usual manner and, in addition, the control apparatus rotates the control knobs of the projector to the predetermined correction position. When the slide carrier is returned to its normal position, the screen is unblanked and the projected image includes the adjustment corrections.

A feature of this invention relates to a mechanical control apparatus which automatically focuses the stereo image in accordance with predetermined corrections when the slide carrier is operated to change slides. The mechanical control apparatus has two control units, one for the horizontal adjustment and one for the vertical adjustment. Each of the control units has two drums which are concentrically mounted on a preselector shaft.

The inner drum is attached to the preselector shaft which is manually rotated to register the preselection. Depending upon the direction of rotation of the inner drum, one of two oppositely wound springs is resiliently distorted with the distortion relating to the magnitude of the preselection correction. A feature of this invention pertains to means for preventing the distortion of one spring when the other spring is distorted to register the preselection correction.

The outer drum of the control unit is rotated under control of the distorted spring when the slide carrier is actuated to change slides, or any time under control of a manual release button. Still another feature of this invention relates to means for preventing override, or excessive rotation of the outer drum. When the outer drum is allowed to rotate it is accurately positioned in accordance with the preselection correction. The outer drum is coupled by a flexible shaft to one of the projector control knobs so that the projector control knob is rotated with the outer drum to the preselected position.

Further objects, features and advantages will become apparent upon considering the following description and drawings wherein:

Fig. 1 is a pictorial view of the projector and control apparatus of this invention;

Fig. 2 is a top view and partial sectional view of the mechanical control apparatus of this invention; and Fig. 3 is a partial sectional view taken along line 3—3 of Fig. 2.

Referring to Fig. 1, the projector 10, shown in phantom, is a conventional stereo projector. The projector 10 has a slide carrier 11 which is utilized to change slides. In the position shown in Fig. 1, with the handle member 12 of the carrier 11 positioned in flange 15, a stereo slide, not shown, is in projection position. The carrier 11, however, blocks the beam from the light source in housing 16. When the handle member 12 is partially moved in flange 15 to its outward position, the beam from the light source in housing 16 is allowed to pass through the slide and the lenses 13 and 14. The slide remains in projection position when the member 12 is moved to its outward position. With the member 12 in its outward position, the next slide to be projected may be inserted between the member 12 and flange 15. When the member 12 is thereupon moved to its inward position in flange 15, the beam is blanked, the already projected slide is ejected and the next slide is moved to projection position. The slide carrier 11 is referred to as normal when the handle member 12 is in its outward position, and as operated when the beam is blanked and the member 12 is in its inward position.

The lenses 13 and 14 are adjusted to focus the image by a focusing knob 17 and to correct alignment errors between the two views of the stereo slide by control knobs 18 and 19. The rotation of knob 17 simultaneously moves the lenses 13 and 14 towards or away from the slide. The knob 17 is utilized if the projection distance is changed, if the views of the slide move while they are in the projection position or if a different thickness slide is utilized. The rotation of knob 19 adjusts the vertical alignment of the lenses 13 and 14, and the rotation of the knob 18 adjusts the horizontal alignment of the lenses 13 and 14. The lenses 13 and 14 can therefore be moved relative to each other either vertically or horizontally. The knobs 19 and 18 are utilized to correct alignment errors between the two views of a mounted stereo pair. A mounting error as small as .15 millimeter may cause eyestrain and destroy the three-dimensional effect.

The control knobs 18 and 19 are connected, respectively, by the flexible shafts 20 and 21 to the output shafts 23 and 22 of the control apparatus 25. The apparatus 25 is utilized to rotate the control knobs 18 and 19 in accordance with predetermined and preselected alignment corrections of a stereo slide before the slide is projected. When the screen is unblanked by the slide carrier 11, the corrected image is projected. The necessity for correcting the image in view of the audience is, in this manner, obviated.

The control apparatus 25 has a top panel 26, side panels 29, a back panel 30, a sloped viewing panel 27, a front panel 43 shown in Fig. 2, and a bottom panel 44 also shown in Fig. 2. The panels 26, 27, 29, 30, 43 and 44 are connected together by screws 51 to form a flat-shaped box which encloses the rest of the control apparatus 25 shown in Fig. 2. The panel dimensions shown in Fig. 1 are approximate. The top panel 26 has an integral extension arm 28 which has a flat depression 28A, and the main part of panel 26 has two flat depressions 26A and 26B. The three legs of the projector 10 are seated in the depressions 28A, 26A and 26B. The projector 10 is, in this manner, supported on top of the control apparatus 25. The back panel 30 of the control apparatus rotatably supports the shafts 22 and 23 to which are connected the flexible shafts 20 and 21.

The shafts 22 and 23 are the output members of two control units 25A and 25B which are part of the apparatus 25. The units 25A and 25B are similar with only the unit 25A being shown in detail. The unit 25A is utilized to control the rotation of the vertical control knob 19 and the control unit 25B is utilized to control the rotation of the horizontal control knob 18. The shaft 22 of the unit 25A is supported by the bushing 34 which is connected to the bottom panel 44 by the screws 31.

The control unit 25A comprises an outer drum 32 and an inner concentric drum 33. The output shaft 22 is connected by the screw 35 to the hub 36 of the outer drum 32. When the outer drum 32 is rotated, as is hereinafter described, the shaft 22, therefore, rotates therewith. The hub 36 is part of a circular plate 37 which together with a circular plate 38 form the sides of the drum 32. The plates 37 and 38 support a peripheral member 39 which is affixed thereto by screws 40. The hub 36 of plate 37 rotatably supports one end of a preselector shaft 41 which in turn supports the inner drum 33. The other end of the shaft 41 is rotatably supported by a bushing 42 which is threaded into the front panel 43. A nut 47 prevents the rotation of the threaded bushing 42.

The inner drum 33 includes a peripheral member 45, which is connected by the screws 46 to the input bushing 48. The screws 46 pass through the member 45 and the bushing 48 to engage the preselector shaft 41. In this manner, when the shaft 41 is rotated, the bushing 48 and member 45 rotate therewith. The shaft 41 also rotatably supports two output bushings 49 and 50 which are symmetrically positioned on opposite sides of the bushing 48.

The two output bushings 49 and 50 are connected, respectively, to the input bushing 48 by two oppositely wound helical springs 52 and 53. When the input bushing 48 is rotated with the preselector shaft 41, only one of the springs 52 and 53 is distorted or tightened. Looking from the left in Fig. 2, when the shaft 41 is rotated in a clockwise direction, the spring 53 is distorted and when the shaft 41 is rotated in a counterclockwise direction, the spring 52 is distorted. One of the springs 52 and 53 is distorted when the shaft 41 is rotated because normally the associated one of the bushings 49 and 50 is prevented from rotating by a pin linkage. A pin 54 which extends from the bushing 49 bears against a pin 55 which extends from the inner surface of the plate 37. Similarly, a pin 56 which extends from the bushing 50 bears against a pin 57 which extends from the plate 38. The outer drum 32 normally does not rotate when shaft 41 is rotated due to a brake 59 which is part of the release assembly 60. The brake 59 normally bears against a correction indicator 61 which is attached by screws 62 to the plate 38. The outer drum 32 is, in this manner, attached to the braked indicator 61. When the release assembly 60 is operated, after one of the springs 52 and 53 has been distorted, the outer drum 32 is allowed to rotate.

The indicator 61 is one of two indicators 61 and 63 that are mounted on the shaft 41. The indicator 61 is rotatably mounted on shaft 41 and connected by the drum 32 to the shaft 22, and the preselector indicator 63 is attached to the shaft 41 by the screw 64. The panels 29, 30 and 43 are, of course, wide enough to allow for a clearance between the indicators 61 and 63 and the panels 26 and 44 of the apparatus 25. When the shaft 41 is rotated by the horizontal preselector knob 66, the indicator 63 and the bushing 48 are rotated therewith. In addition to the knob 66, the front panel 43 also supports the vertical preselector knob 67 which is part of the unit 25B, and a release button 68 which is part of the release assembly 60. The knobs 66 and 67 are attached to the shafts 41 of units 25A and 25B by screws 69.

The two indicators 61 and 63 are each peripherally numbered from 1 to 9 over a 320-degree arc. The numbers are, therefore, spaced at 40-degree intervals. The numbered positions correspond to positions of the control knobs 18 and 19 of the projector 10. Each of the control knobs 18 and 19 is similarly numbered. The knob 19 rotates together with the indicator 61 due to the linkage through the drum 32, shaft 22 and flexible shaft 21. Positions 5 of the control knobs 18 and 19 are the normal positions indicating no alignment corrections.

Before a stereo slide is projected, it is previewed to determine the alignment corrections. Thereafter whenever the slide is to be projected, the knobs 66 and 67 are rotated to register, as a preselection, the predetermined corrections. When the release assembly 60 is operated, the control knobs 18 and 19 are rotated by the apparatus 25 to the preselected positions.

When the slide is to be previewed, it is moved by the slide carrier 11 to the projection position. When the handle member 12 is thereafter moved to its outward position, the slide is projected with the projected image including the alignment errors. With the flexible shafts 20 and 21 detached, the knobs 19 and 18 are manually rotated to correct the alignment errors of the projected slide. When the image is clear, the correction positions of knobs 19 and 18 are noted. The vertical alignment correction, for example, may be 1 and the horizontal alignment correction may be 6.

Thereafter, when the previewed slide is to be projected, it is inserted in the slide carrier 11 and the predetermined alignment corrections are registered in the apparatus 25. The numbers on the indicators 63 and 61 are viewed through the holes or transparent circular areas 70 of the sloped panel 27. To register the preselections of the slide, knobs 66 and 67 are rotated until the predetermined position or number on the indicators 63 appears through the transparent areas 70. For the example described above, the knob 66 is rotated from position 5 in a counterclockwise direction, as viewed from the left in Fig. 2, until the number 1 on indicator 63 appears through area 70 to register the vertical alignment correction. The knob 67 is rotated in a clockwise direction from position 5 until the number 6 appears to register the horizontal alignment correction. The rotation need not necessarily start at position 5. The starting point may be at any position.

When the knob 66 is rotated, the shaft 41, indicator 63 and bushing 48 are rotated therewith. The indicator 63 has a detent plate 75. The plate 75 has a circularly arranged plurality of detents 73 which bear against the detent wheels or bearings 72. The wheels 72 are rotatably supported on the resilient arms 74 which force the wheels 73 against the plate 75. The arms 74 are attached to a stationary supporting member 76 which is threaded over the bushing 42. When the knob 66 is rotated, therefore, the detent plate 75 rotates against the detent wheels 73 to discretely position the shaft 41 in one of the nine correction positions. Stops, not shown, limit the maximum rotation in either direction.

When the bushing 48 is rotated in a counterclockwise direction, the spring 52 is distorted. The spring 52 is distorted because its end, which is attached to the bushing 49, is stationary. The bushing 49 cannot rotate in a counterclockwise direction, as urged by the spring 52, because the pin 54 bears against the stop or pin 55 of the outer drum 32 and the drum 32 cannot rotate until the release assembly 60 is operated.

The spring 53 does not tighten or become distorted when the bushing 48 is rotated in a counterclockwise direction because the bushing 50 is free to rotate in a counterclockwise direction when so urged by spring 53. The pin 57, described above, only prevents the clockwise rotation of the bushing 50. The bushing 50 is also rotated by the pin 77 which extends from the peripheral member 45 of the inner drum 33. When the inner drum 33 is rotated, the pin 77 bears against the pin 56 of the bushing 50. An opposite pin 78 is rotated away from the pin 54 of bushing 49. The pins 77 and 78 serve two functions: they prevent the distortion of the unused spring and they limit the rotation of the used bushing. In the example described herein, the pin 77 prevents the distortion of spring 53 by rotating the bushing 50 with the bushing 48 and the pin 78 limits the rotation of the bushing 49 when it is allowed to rotate. Normally, with both indicators 61 and 63 at the same position before a preselection is registered, the springs 52 and 53 are slightly distorted so that pin 54 bears against pin 78 and pin 56 bears against pin 77.

The control unit 25A remains in this condition with indicator 63 at position 1, and indicator 61 at position 5, until the assembly 60 is operated. The assembly 60 is operated either manually, at any time, by pressing button 68, or automatically, when the slide carrier 11 is operated and the beam is blanked, by closing an energizing path for solenoid 80. If only manual release is required, the solenoid 80 is not utilized. The solenoid 80 is attached to the bottom panel 44 by screws 85. The energizing path for solenoid 80 is from source 93 through armature 92 which is mounted on the slide carrier 11. When the carrier 11 is operated, the armature 92 is automatically closed. The plunger 81 of the solenoid 80 is at one end of the release shaft 82 and the button 68 is at the other end. The shaft 82 is movably supported by the bushing 83, a bushing 84 and the front panel 43. The bushings 83 and 84 are attached, respectively, to the bottom panel 44 by screws 87 and 86. A part of the assembly 60 including the bushing 84 is shown also in Fig. 3. As shown in Fig. 3, the shaft 82 is connected by the pivot arm 89 to the brake shaft 88 which supports the brake 59 described above. The arm 89 is pivoted at one end on the shaft 82, at the other end on the shaft 88 and at its center to the stationary bracket 90 which is part of the bushing 84. When the release assembly 60 is operated, the shaft 82 is moved to the right rotating arm 89 in a counterclockwise direction. As the arm 89 rotates, it moves the shaft 88 to the left to disengage the brake 59 from the indicators 61 of units 25A and 25B and to compress a spring 95 between the bushing 84 and the brake 59.

When the brake 59 disengages the indicators 61 of units 25A and 25B, the outer drums 32 are free to rotate. Urged by the distorted spring 52, the bushing 49 and the outer drum 32 of unit 25A are rotated in a counterclockwise direction. At position 1, as indicated through the transparent areas 70, the pin 54 is stopped, as described above, by the pin 78. The outer drum 32 is rotated by the bushing 49 because the pin 54 bears against the pin 55.

When the outer drum 32 of unit 25A is rotated, the shafts 22 and 21 and the knob 19 are rotated therewith to adjust the lenses 13 and 14 in accordance with the vertical alignment correction corresponding to position 1 of the knob 19. The knob 18 is rotated in a similar manner by the unit 25B to adjust the lenses 13 and 14 in accordance with the horizontal alignment correction.

When the slide carrier 11 is returned to normal, the armature 92 is opened and the screen unblanked. The projected image is clear because the lenses 13 and 14 were adjusted before projection to correct the alignment errors of the slide. When armature 92 opens, the solenoid 80 deenergizes to allow the spring 95 to return the brake 59 to its braking position against the indicator 61.

During the time one slide is being projected, the alignment corrections for the next slide may be preselected. These corrections have also been previously noted when the slides were previewed. For example, if the vertical correction of the second slide is 7, the knob 66 is rotated in a clockwise direction, as viewed from the left in Fig. 2, from position 1 to position 7. The knob 66 rotates the shaft 41, the indicator 63, and the bushings 48 and 49. The bushing 50 is restrained as the pin 56 bears against the pin 57. With bushing 50 stationary, and bushing 48 rotated, the spring 53 is distorted.

When the slide carrier 11 is operated to change slides, the screen is blanked and the lenses 13 and 14 are adjusted in accordance with the second set of alignment corrections. When the carrier 11 is operated, the release assembly 60 is operated and the outer drum 32 is released. When the outer drum 32 is released, it is rotated by the spring 53 with the bushing 50, indicator 61 and shaft 22 to position 7. When the slide carrier 11 is returned to normal the corrected image is projected.

A control unit which is similar to the unit 25A may also be provided for the focusing knob 17 of the projector 10, so that focusing and alignment correction may be both semiautomatically provided. The term focusing broadly includes alignment corrections.

It is to be understood that the above-described arrangements are illustrative of the application of the principles of this invention. Numerous other arrangements may be devised by those skilled in the art without departing from the spirit and scope of the invention. For example, the slides may be previewed without detaching the flexible cables 20 and 21 by providing a previewing switch which short-circuits the switch 92. With the previewing switch operated, the brake assembly 60 is operated. With the carrier 11 in its normal position, the slide, which is to be previewed, is projected. With the previewing switch operated, the assembly 60 is operated, so that the rotation of knobs 66 and 67 rotates the outer drums 32 and the knobs 18 and 19 therewith. The alignment corrections can, therefore, be determined by adjusting knobs 66 and 67.

It is evident, therefore, that numerous other arrangements can be provided without departing from the spirit and scope of this invention.

What is claimed is:

1. A stereo projector having two adjustable lenses; a source of light; a carrier for positioning stereo slides between said source and said lenses having a normal position in which a stereo slide is projected and an operative position in which light from said source is blocked; and a semiautomatic mechanical control device for adjusting the position of said lenses relative to each other comprising a first control unit for adjusting the horizontal alignment of said lenses, means coupling said first unit to said lenses, a second control unit for adjusting the vertical alignment of said lenses, means coupling said second unit to said lenses, said first and said second control units each comprising a preselector rotatable shaft, an inner drum rotatable with said preselector shaft, an outer drum rotatably supported on said shaft and concentric with said inner drum, an output shaft connected to said outer drum, means for normally preventing the rotation of said outer drum, two oppositely wound springs connected to said inner drum, a first output bushing rotatably mounted on said preselector shaft and connected to one of said springs, a second output bushing rotatably mounted on said preselector shaft and connected to the other of said springs, a stop mounted on said outer drum for normally preventing the rotation of said first bushing when the connected one of said springs is distorted, a stop mounted on said outer drum for normally preventing the rotation of said second bushing when the connected one of said springs is distorted, a pin linkage mounted on said inner drum for rotating one or the other of said bushings to prevent the distortion of one of said springs, and means including a circuit arrangement operative under control of said carrier when its position is changed from said normal to said operative position for disabling said rotation preventing means to allow the rotation of said outer drum and the other of said bushings.

2. A control system for stereo projections for first registering a rotation preselection corresponding to a correction of an alignment error of a stereo pair and then for rotating an output shaft in accordance therewith comprising a preselector rotatable shaft, an inner drum rotatable with said preselector shaft, an outer drum rotatably supported on said shaft and concentric with said inner drum, an output shaft connected to said outer drum, means including a coupling between said output shaft and said stereo projector and controlled by said output shaft for adjusting said stereo projector, means for normally preventing the rotation of said outer drum, two oppositely wound springs connected to said inner drum, a first output bushing rotatably mounted on said preselector shaft and connected to one of said springs, a second output bushing rotatably mounted on said preselector shaft and connected to the other of said springs, a stop mounted on said outer drum for normally preventing the rotation of said first bushing when the connected one of said springs is distorted, a stop mounted on said outer drum for normally preventing the rotation of said second bushing when the connected one of said springs is distorted, and means for disabling said rotation preventing means to allow the rotation of said outer drum.

3. A control system for stereo projectors for first registering a rotation preselection corresponding to a correction of an alignment error of a stereo pair and then for rotating an output shaft in accordance therewith comprising a preselector rotatable shaft, an inner drum rotatable with said preselector shaft, an outer drum rotatably supported on said shaft and concentric with said inner drum, an output shaft connected to said outer drum, means including a coupling between said output shaft and said stereo projector and controlled by said output shaft for adjusting said stereo projector, means for normally preventing the rotation of said outer drum, two oppositely wound springs connected to said inner drum, a first output bushing rotatably mounted on said preselector shaft and connected to one of said springs, a second output bushing rotatably mounted on said preselector shaft and connected to the other of said springs, a stop mounted on said outer drum for normally preventing the rotation of said first bushing when the connected one of said springs is distorted, a stop mounted on said outer drum for normally preventing the rotation of said second bushing when the connected one of said springs is distorted, a pin linkage mounted on said inner drum for rotating one or the other of said bushings to prevent the distortion of one of said springs, and means including an electrical circuit connected to said stereo projector for disabling said rotation preventing means to allow the rotation of said outer drum and the other of said bushings.

References Cited in the file of this patent

UNITED STATES PATENTS

| | | |
|---|---|---|
| 1,931,128 | Bradford | Oct. 17, 1933 |
| 2,528,489 | Bednash et al. | Nov. 7, 1950 |
| 2,580,874 | Wottring | Jan. 1, 1952 |
| 2,598,573 | Lutes | May 27, 1952 |
| 2,653,511 | Correa | Sept. 29, 1953 |
| 2,704,008 | Owens | Mar. 15, 1955 |
| 2,750,444 | Owens | June 12, 1956 |